United States Patent [19]

Cooper

[11] 4,034,203
[45] July 5, 1977

[54] ELECTRICALLY HEATED STEAM GENERATOR

[76] Inventor: Jerry D. Cooper, 1210 N. Texas, Odessa, Tex. 79761

[22] Filed: Aug. 19, 1974

[21] Appl. No.: 498,748

[52] U.S. Cl. .................... 219/272; 137/341; 219/275; 219/307; 219/309; 219/382; 222/146 HE; 239/136

[51] Int. Cl.² ............ H05B 1/02; F22B 1/28; B05B 1/24; F24H 11/104

[58] Field of Search ............ 219/296–309, 219/374, 375, 379–382, 271–276; 239/133, 135, 136, 137; 222/146 R, 146 HE, 146 H; 137/341; 138/125, 126

[56] References Cited

UNITED STATES PATENTS

| 383,536 | 5/1888 | Newman | 219/296 X |
|---|---|---|---|
| 1,457,634 | 6/1923 | Neri | 222/146 HE |
| 2,033,111 | 3/1936 | Carleton | 219/297 |
| 2,117,419 | 5/1938 | Hamrick et al. | 219/306 |
| 2,641,508 | 6/1953 | Stoner et al. | 239/137 X |
| 2,720,868 | 10/1955 | Wollner et al. | 239/136 X |
| 2,861,838 | 11/1958 | Wyatt et al. | 239/137 |
| 2,878,360 | 3/1959 | Tavender et al. | 219/306 X |
| 3,049,302 | 8/1962 | Simmons | 239/137 X |
| 3,062,241 | 11/1962 | Brumbach | 138/125 |
| 3,097,288 | 7/1963 | Dunlap | 219/307 |
| 3,099,737 | 7/1963 | Naxon | 219/300 X |
| 3,682,202 | 8/1972 | Buhrmann et al. | 138/126 |

FOREIGN PATENTS OR APPLICATIONS

| 161,709 | 3/1955 | Australia | 219/307 |
|---|---|---|---|
| 208,974 | 6/1957 | Australia | 219/300 |
| 123,512 | 2/1947 | Australia | 219/300 |
| 163,970 | 9/1949 | Austria | 219/306 |
| 1,235,849 | 6/1971 | United Kingdom | 219/307 |
| 16,214 | 6/1914 | United Kingdom | 219/300 |

Primary Examiner—A. Bartis
Attorney, Agent, or Firm—Marcus L. Bates

[57] ABSTRACT

A compact portable electrically heated steam generator includes an electrical resistance heating element loosely centrally located within a flexible reinforced non-metallic tube through which the liquid to be converted to steam can flow. Grounded metallic inlet and outlet couplings are provided at the ends of the tube and the ends of resistance element is electrically connected thereto. At least one intermediate point of the resistance element is connected to a source of electricity in such manner that electrical current flows across the resistance element to ground so that the liquid flowing through the tube is heated and vaporized. A part of the resistance element is arranged to be under control of a temperature responsive switch having a temperature sensor downstream of the outlet coupling.

5 Claims, 6 Drawing Figures

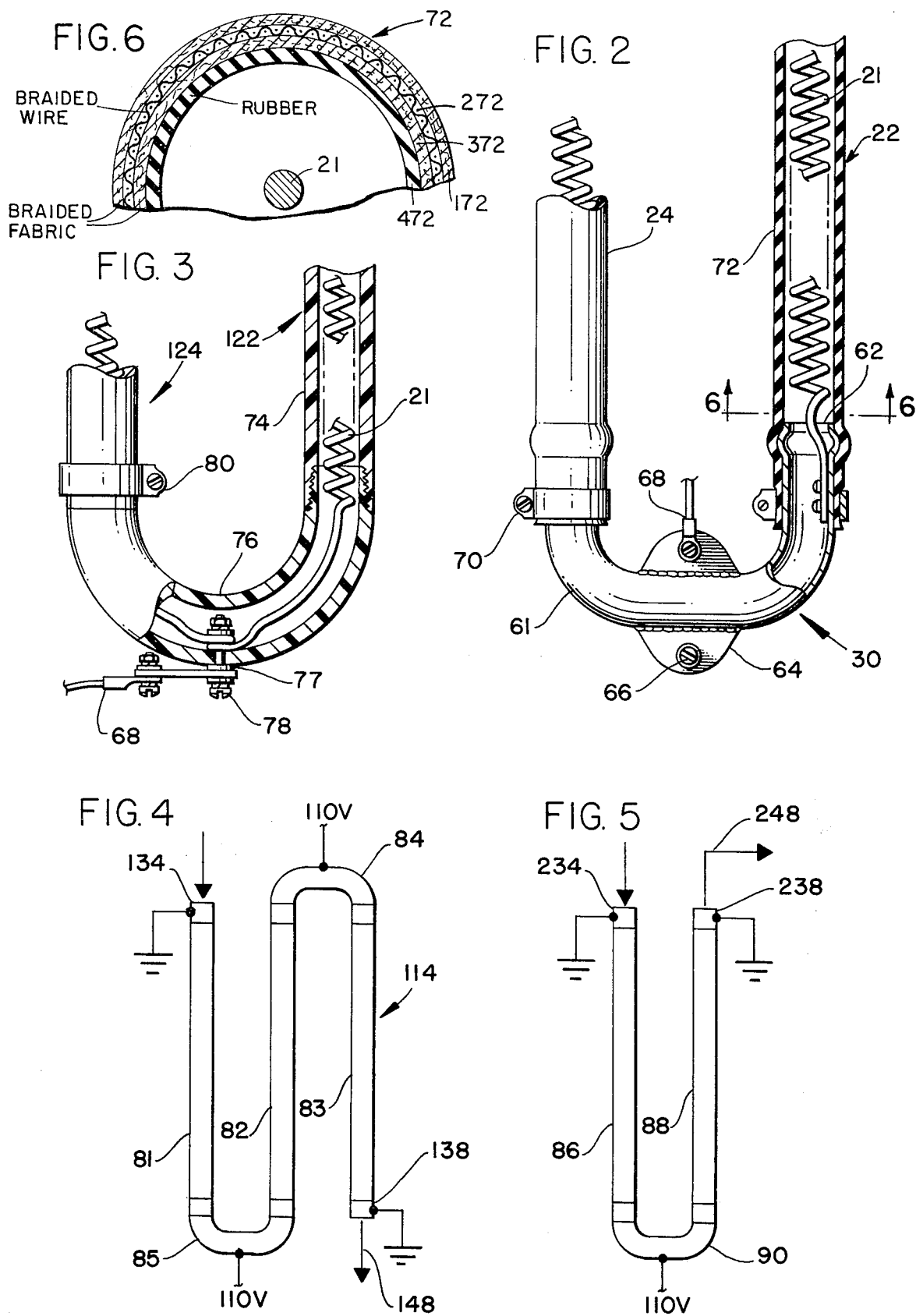

ELECTRICALLY HEATED STEAM GENERATOR

BACKGROUND OF THE INVENTION

Portable hot water and steam generation equipment are usually massive, complex, and expensive apparatus which requires a considerable investment in capital and which often must be moved about on a wheeled cart. Usually the weight of a generator prevents it from being lifted vertically in the absence of assistance from auxiliary hoisting equipment.

Mechanics who work on internal combustion engines, filling station attendants who clean automotive vehicles, painters who desire to strip paint from vessels, and handy men tinkering about in their workshop often have need of steam generation equipment in order to clean debris from various surfaces of apparatus upon which they are working. The complexity of operation and cost of owning a steam generator of the prior art usually cause these individuals to resort to other modes of cleaning.

The volume of water and the energy required to supply a adequate flow of steam for the purposes of cleaning the above type equipment is surprisingly small. Most workmen have both a suitable source of electrical energy as well as a suitable source of water under pressure in their immediate vicinity. It would accordingly be desirable to utilize this source of water and electrical energy in a low cost, economical, safe steam generator apparatus so that an available source of steam could be enjoyed by anyone having such a need at any time.

SUMMARY OF THE INVENTION

This invention relates to an economical simple steam generator which utilizes electricity as a source of heat, with the electricity being isolated from the user in a manner which precludes anyone from inadvertently coming into contact therewith.

One specific form of the invention comprises an elongated plastic tube having a longitudinally extending axial passageway formed therethrough through which liquid can flow. Opposed ends of the tube are defined by an inlet and an outlet, with the inlet being connected to the source of water pressure and the outlet being connected to suitable steam nozzle. An electrical resistance heating element is loosely received within the axial passageway and has the terminal ends thereof electrically grounded in close proximity to the inlet and the outlet. At intermediate portion of the electrical element is connected to a suitable source of electricity so that water, when flowing through the tube is heated by the electrical element causing steam to be formed as it flows from the inlet to the outlet.

Control circuitry is provided for controlling the action of the generator and greatly enhances its operation.

Accordingly, a primary object of this invention is the provision of improvements in electrical steam generation apparatus Another object of the invention is the provision of an inexpensive, simple, highly efficient means for heating water.

A further object of this invention is the provision of improvements in electrical steam generators having electrical resistance heating elements which impart sufficient heat into the water to convert the water into steam.

A still further object of this invention is the provision of improvements in electrical means by which water is converted into steam.

Another and still further object is the provision of an improved electrical hot water heater having the components thereof, that may be encountered by people, maintained at ground potential.

These and various other objects and advantages of the invention will become readily apparent to those skilled in the art upon reading the following detailed description and claims and by referring to the accompanying drawings.

The above objects are attained in accordance with the present invention by the provision of apparatus fabricated in a manner substantially as described in the above abstract and summary.

BRIEF DESCRIPTION OF THE DRAWINGS

FIG. 2 is an enlarged, fragmentary, part-cross-sectional representation of part of the steam generation apparatus disclosed in FIG. 1;

FIG. 3 is similar to and sets forth a modification of the apparatus disclosed in FIG. 2;

FIG. 4 is a part diagrammatical, part schematical representation of still another form of the present invention; and, FIG. 5 is similar to FIG. 4, but sets forth still another embodiment of the present invention.

FIG. 6 is a detailed, enlarged fragmentary cross-sectional view of part of the apparatus, taken along line 6—6 of FIG. 2.

DETAILED DESCRIPTION OF THE INVENTION

Figure 1:
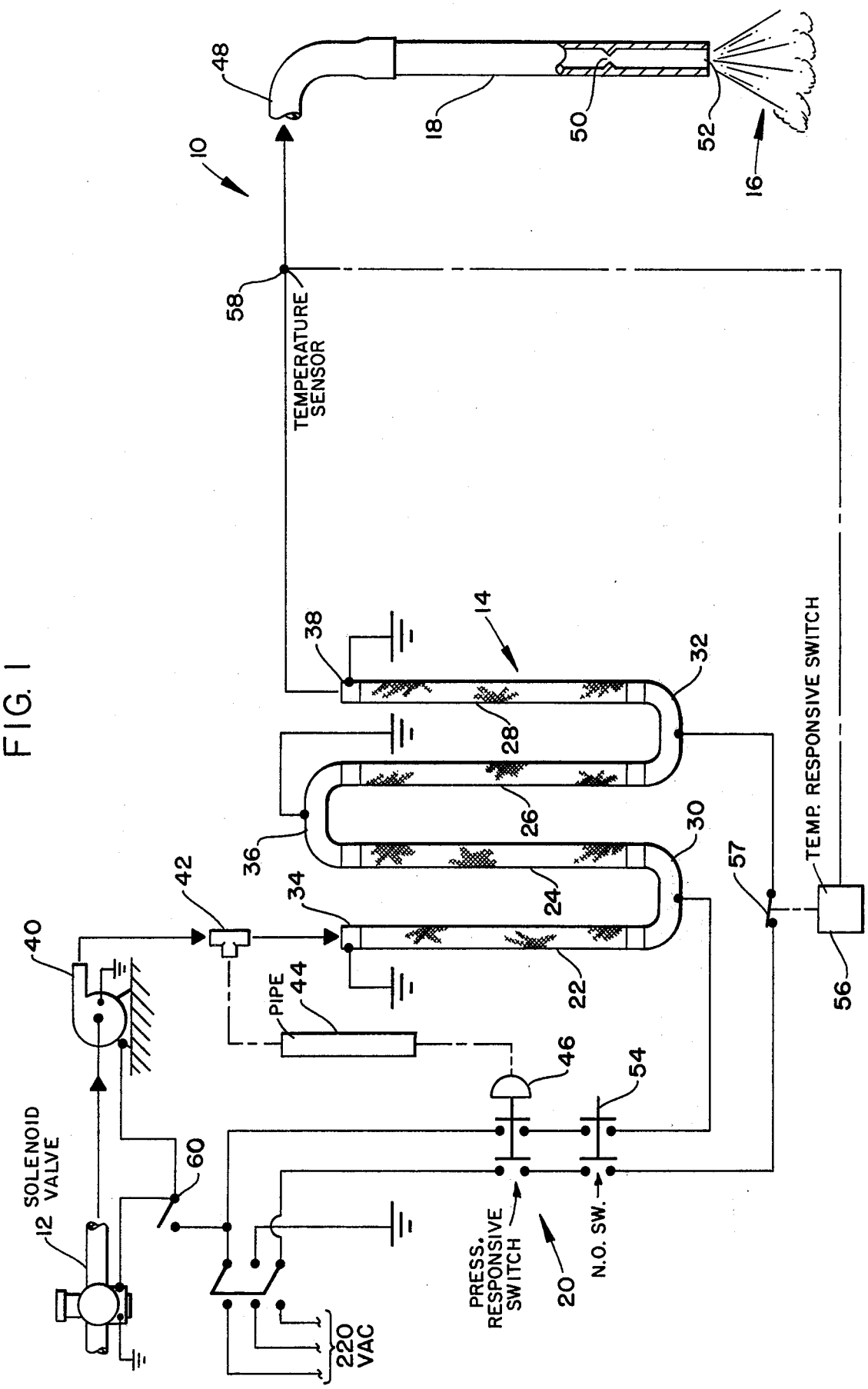
FIG. 1 is a part schematical, part diagrammatical illustration of a steam generation system made in accordance with the present invention, with some parts thereof being broken away and the remaining parts being shown in section.

In the illustration of FIG. 1, the numeral 10 broadly indicates one specific form of the invention. A supply of water at solenoid actuated valve 12 is flow conducted to a steam boiler 14 for producing steam at 16, which exits from a suitable nozzle 18 of conventional design.

Circuitry 20 controls the action of an electrically powered heating element 21 contained within the series connected heat generating members 22-28.

In the single phase 220v power supply of FIG. 1, the boiler members 22-28 are electrically connected so that the 220v is imposed across the combination electrical and water connectors 30 and 32, while the connectors 34-38 are each grounded. This results in the connectors 34, 36, and 38 being placed at ground potential thereby obviating the likelihood of injury from personnel inadvertently contacting any voltage whatsoever.

Pump 40 is connected to Tee fitting 42, which in turn is connected by means of pipe 44 to a pressure responsive switch 46, with the switch being in the normally open position. That is, when the switch is laying on the store shelf, the contacts thereof are in the non-conducting configuration. The solenoid actuated valve 12 is connected to pump 40, tee fitting 42, and inlet connection 34 by means of metallic pipe so that a ground return for the electrical circuitry thereof is effected. Otherwise, the solenoid actuated valve and pump means must individually be grounded as illustrated in the drawings.

Outlet connector 38 is connected to a flexible hose 48, and the hose nozzle is affixed to a handle portion of the nozzle. Orifice 50, located within the nozzle, provides a pressure drop thereacross so that steam normally flows through outlet 52 while heated water is contained upstream of the orifice. Stated differently, the pressure drop across the nozzle is adjusted to a value which normally causes superheated water to be present upstream of the orifice while steam vapors are present downstream of the orifice.

Normally open switch 54 is interposed within both 110v legs of the 220v A.C. circuitry for controlling the flow of current to members 30 and 32. Temperature responsive switch actuating means 56 preferably is in the form of a thermostat having a sensor 58 connected downstream of the last member of the boiler. Manually operated pump motor switch 60 controls the supply of current to an electric motor which drives pump 40, as well as to the solenoid actuated valve which supplies water to the system.

In operation, the main switch connecting the source of 220v to the boiler system is closed, then switch 60 is closed, thereby energizing the motor of pump 40, causing flow of water to occur through the boiler, and through the nozzle 18, with the orifice 50 preventing undue waste of water. Proper water pressure effected at the pressure switch causes a source of electrical energy to be available at manually operated switch 54. Switch 54, when moved to the closed position, provides a source of current at connectors 30 and 32. Since the water at 58 is at room temperature, switch 56 is in the closed position and accordingly, all four legs 22–28 will have 110v imposed thereacross to thereby rapidly generate a temperature in excess of 220° F. This action causes water flowing at 48 to be imparted with sufficient heat energy to be vaporized into steam as it passes the orifice, thereby producing steam at the outlet.

As the temperature at 58 reaches a predetermined value above the normal boiling point of water, thermostat 56 moves switch 57 to the opened position, thereby transferring less heat energy into the water, whereupon the temperature of the water falls to a value which remains above the normal boiling point of water, whereupon the thermostat 56 again closes switch 57. The apparatus cycles in this manner until switch 54 is moved to the open position, thereby de-energizing the current flow to the heating elements of the boiler.

In the event the pump motor should malfunction, or the water supply should fail, switch 46 will move to the open position, thereby de-energizing the entire apparatus and preventing damage to the system.

In FIG. 2, the connector 30 is seen to be comprised of a metal U-tube 61 having a flaired connector formed at 62. A mounting pad 64 is integrally affixed to the tube so that mount screw 66 can mount the boiler member to a properly insulated mounting bracket, while electrical terminal 68 can be affixed to another portion thereof as may be deemed desirable. The heat generating member 22 is a flexible hose 72, which is removably affixed in sealed relationship about the U-tube by means of a clamp 70.

As seen in FIG. 6, the flexible hose 72, preferably is a four-ply braided hose having a rubber liner 472 surrounded by a braided wire shield 272 with braided fabric 172 or 372 interposed on either side of the wire shield. Such a hose is available from Imperial Eastman Company and is identified as Y910SAE 100R5 which is 0.5 inches inside diameter and has a 300° F upper temperature limit.

The heating element 21 preferably is 18 gauge Nichrome wire having a 7/32nds outside diameter coil, and is available from Glow Heat Coil Company, Seattle, Washington, Catalog number GJ104-10, with 35 inches of coil being equal to 3000 watts.

The individual elements are loosely received within the resilient tubular housing so that water flows thereabout continually cooling the coil as the coil gives up its heat energy into the water.

In the embodiment of FIG. 3, boiler members 122 and 124 preferably have a longitudinally extending tube 74 made of woven fiberglass bonded filaments, and is available from Polygon Plastics Company, Walkerton, Indiana. As seen in FIG. 3, the fiberglass U-tube 76 is provided with an electrical connector 77 comprised of screw 78 which sealingly engages the wall of the U-tube and electrically connects the wire 68 to the heating element 21. Clamp 80 can be placed anywhere along the exterior of the fiberglass tube for mounting purposes.

In FIG. 4, boiler members 81, 82, and 83 relate to members 22–28 of FIG. 1, with member 82 being the equivalent of both members 24 and 26 so far as regards the voltage drop thereacross. Members 134 and 138 are maintained at a grounded potential as in the example of FIGS. 1 or 2, with the 110v supply being connected to U-tubes 84 and 85 which may be fabricated in accordance with either of FIGS. 2 or 3.

FIG. 5 sets forth the details of a smaller 110v unit having a pair of legs 86 and 88 connected together at U-tube 90 and provided with a 110v supply. The free depending ends 234 and 238 thereof are gounded as in the foregoing examples. Member 90 can be made in accordance with either of FIGS. 2 or 3 in as may be deemed desirable.

The present invention can be used for generating steam, or for heating water, as may be required. The apparatus is low in cost, safe, efficient, and very light weight.

I claim:

1. An electrical heating apparatus comprising:
    an elongated non-conducting tubular element made of resilient, flexible, polymer reinforced fabric ply; said tubular element having a longitudinally extending axial passageway formed therethrough, through which liquid can flow; opposite ends of said tubular element being defined by an electrical conducting fluid inlet coupling and an electrical conducting fluid outlet coupling;
    a source of water, means connecting said inlet coupling to said source of water, an elongated, flexible electrical resistance element located within and coextensively arranged respective to said axial passageway;
    means electrically connecting the opposite free ends of said electrical resistance element, respectively, to said inlet and outlet coupling, respectively; means by which said inlet and outlet couplings are electrically grounded;
    A plurality of electrical conducting intermediate fluid conducting members connected to intermediate portions of said tubular element; said electrical resistance element having intermediate portions; means by which said intermediate portions of said electrical resistance element are electrically connected to said intermediate fluid conducting members;

circuit means, including a source of current, connected to said intermediate fluid conducting members in such a manner that current flow occurs across said electrical resistance element to ground;

a thermostat having a sensor actuated switch, means connecting said sensor to measure the temperature downstream of said outlet coupling, circuit means connecting said switch to control current flow through part of said electrical resistance element;

so that liquid flowing through said tubular element is heated by said resistance element, thereby elevating the temperature of the liquid as it flows from said inlet coupling to said outlet coupling.

2. The stream generator of claim 1 wherein said source of water includes a pump located upstream of and flow connected to said inlet coupling for supplying water at elevated pressure; an electric motor for said pump;

a pressure sensitive switch, a solenoid actuated control valve located upstream of said pump for controlling the flow of water to said pump; a control switch;

circuit means by which said control switch is connected between said pump motor and said valve to control current flowing thereto;

said pressure sensitive switch being connected between said resistance element and said source of current, so that said solenoid valve must open and provide said pump motor with water, thereby causing said pressure sensitive switch to be moved to the closed position in order that current may be supplied to said resistance element.

3. A steam generator comprising: a fluid conducting elongated resilient flexible hose having a longitudinally extending axial passageway formed therethrough through which liquid can flow; opposite ends of said hose being defined by an electrical conducting fluid inlet member and an electrical conducting fluid outlet member;

means connecting said inlet member to a source of water, an elongated electrical resistance element having terminal ends and an intermediate portion, said resistance element being longitudinally disposed within said axial passageway, means by which the terminal ends of said resistance element are electrically connected to said inlet member and said outlet member; means by which said inlet and outlet members and said intermediate portion are electrically grounded;

means effecting a first electrical connection to said resistance element at a location spaced from said inlet member and said intermediate portion, means effecting a second electrical connection to said resistance element at a location spaced from said outlet member and said intermediate portion; means including circuitry by which said first electrical connection is connected to a source of current, means by which said second electrical connection is connected to a source of current;

A thermostat having a sensor actuated switch; said sensor being connected to measure the temperature downstream of said intermediate portion; circuit means by which said switch is connected to control current flow to one of said first and second electrical connections; whereby:

water flowing through the axial passageway of said tube is heated by said resistance element, thereby causing the water to be controllably heated above its boiling point as it flows from said inlet member to said outlet member.

4. A steam generator comprising: an elongated, electrically non-conducting tube made of resilient, flexible polymer reinforced fabric ply material having a longitudinally extending axial passageway formed therethrough, through which liquid can flow, opposite ends and a medial portion of said tube, respectively, being defined by an electrical conducting fluid inlet member, an electrical conducting fluid outlet member, and an electrical conducting central fluid conducting member;

means by which said inlet member is connected to a source of water, an elongated electrical resistance element longitudinally disposed within said axial passageway and having opposite terminal ends spaced from one another and from an intermediate portion thereof; the opposite terminal ends and the medial portion of said resistance element, respectively, being connected to said inlet member, outlet member, and central member, respectively; means by which said inlet and outlet members and said central member are electrically grounded; means including circuitry connected to said resistance elements at a location intermediate said inlet member and said central member and a location intermediate said outlet member and central member by which a source of current is established across said electrical resistance element so that water flowing through the axial passageway of said tube is heated by said resistance element, thereby causing the water to be heated above its boiling point as it flows from said inlet to said outlet.

5. The generator of claim 4, wherein said means by which said inlet member is connected to a source of water includes a pump means located upstream of and flow connected to said inlet member for supplying water at elevated pressure;

an electric motor for said pump means;

a pressure sensitive switch, a solenoid actuated control valve located upstream of said pump means for controlling the flow of water to said pump means; a pump motor control switch;

circuit means by which said control switch is connected between said pump motor and said valve to control current flowing thereto;

said pressure sensitive switch being connected between said resistance element and said source of current, so that said solenoid valve must open and provide said pump with a source of water when said pressure sensitive switch is moved to the closed position in order that current may be supplied to said resistance element.

* * * * *